(12) United States Patent
Hasselbusch et al.

(10) Patent No.: US 6,739,680 B2
(45) Date of Patent: May 25, 2004

(54) CARTRIDGE ASSEMBLY FOR A TRACK CHAIN

(75) Inventors: Michael D. Hasselbusch, Metamora, IL (US); Roy L. Maguire, Edelstein, IL (US); Darby R. Robertson, Morton, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/224,843

(22) Filed: Aug. 21, 2002

(65) Prior Publication Data

US 2004/0036353 A1 Feb. 26, 2004

(51) Int. Cl.[7] ............................................. B62D 55/21
(52) U.S. Cl. ...................... 305/202; 305/103; 305/118
(58) Field of Search ................................. 305/100, 103, 305/117, 118, 202, 203, 59

(56) References Cited

U.S. PATENT DOCUMENTS

| | | |
|---|---|---|
| 2,551,695 A | 5/1951 | Oddy |
| 2,780,830 A | 2/1957 | Kammerer, Jr. |
| 3,409,336 A | 11/1968 | Dadds |
| 3,463,560 A | 8/1969 | Reinsma et al. |
| 3,492,054 A * | 1/1970 | Boggs et al. |
| 3,601,454 A | 8/1971 | Reinsma |
| 3,680,924 A | 8/1972 | Otto et al. |
| 3,958,836 A * | 5/1976 | Brown et al. |
| 4,095,909 A | 6/1978 | Mackoway |
| 4,120,537 A * | 10/1978 | Roley et al. |
| 4,126,359 A | 11/1978 | Holze |
| 4,324,437 A | 4/1982 | Narang |
| 4,968,104 A | 11/1990 | Bender et al. |
| 5,183,318 A * | 2/1993 | Taft et al. |
| 6,142,588 A * | 11/2000 | Ketting et al. ............. 305/201 |
| 6,382,742 B1 | 5/2002 | Hasselbusch et al. |
| 6,386,651 B1 * | 5/2002 | Geradin et al. ............. 301/100 |

* cited by examiner

Primary Examiner—Russell D. Stormer
(74) Attorney, Agent, or Firm—Jeff A Greene

(57) ABSTRACT

A cartridge assembly for a track chain assembly is provided. The cartridge assembly includes a bushing rotatably positioned about a track pin. Bearing members are positioned about the track pin adjacent the bushing. Collars are positioned about the track pin adjacent the bearing members. Seal arrangements are positioned between the collars and the bearing members and between the bearing members and the track bushing sealably excluding contaminants and the retention of a lubricating fluid from a passage in the bushing and a bore within the track pin.

20 Claims, 6 Drawing Sheets

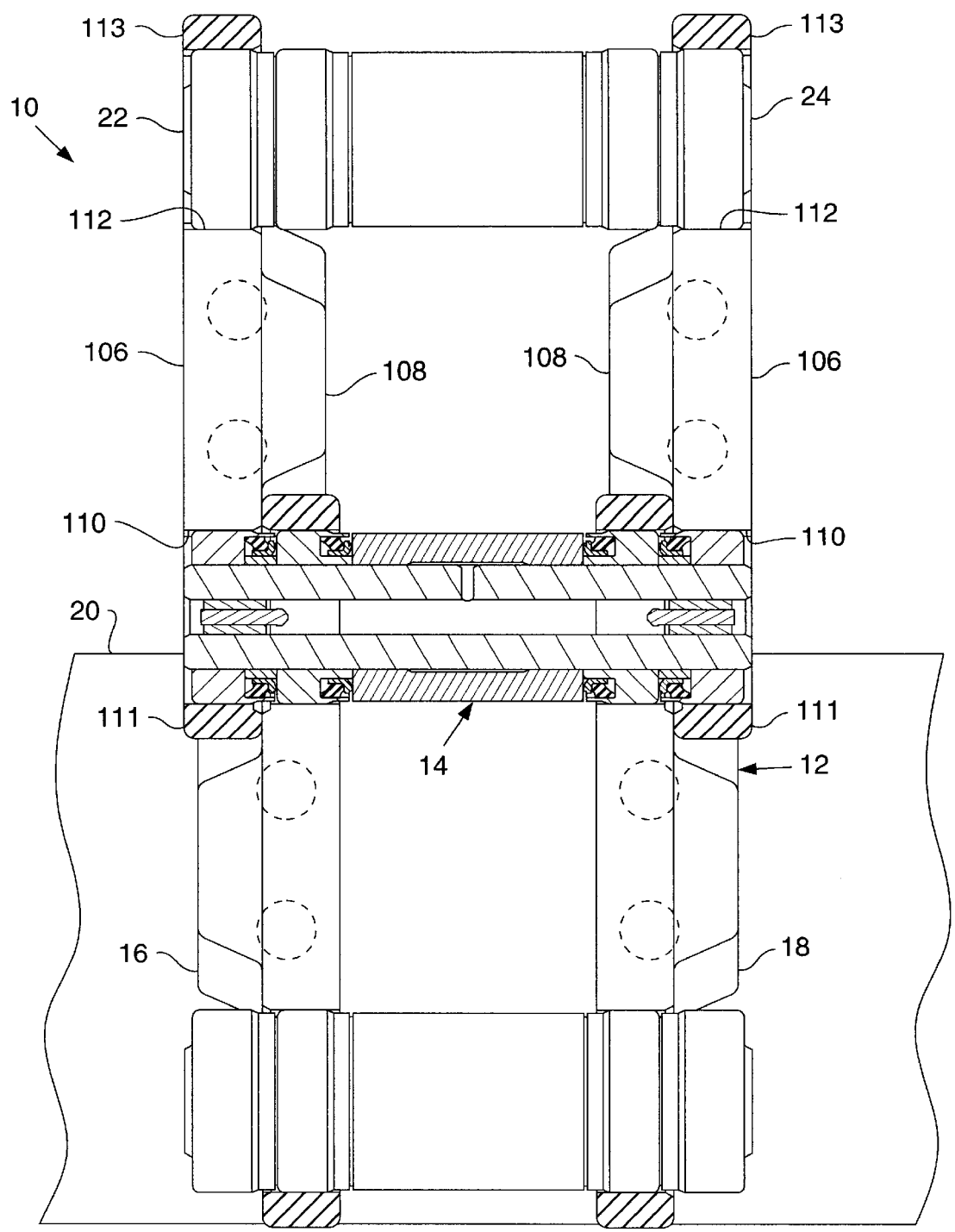

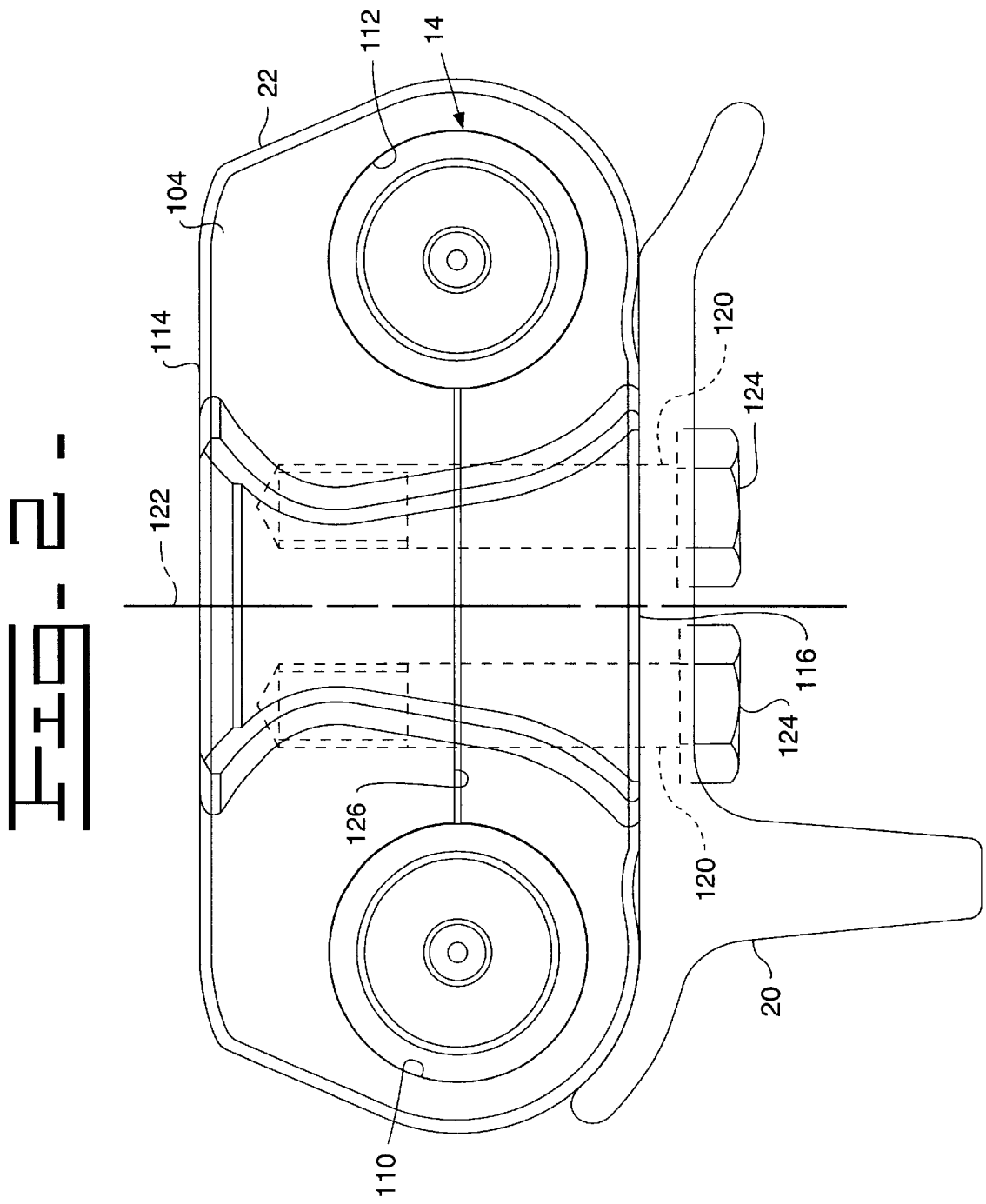

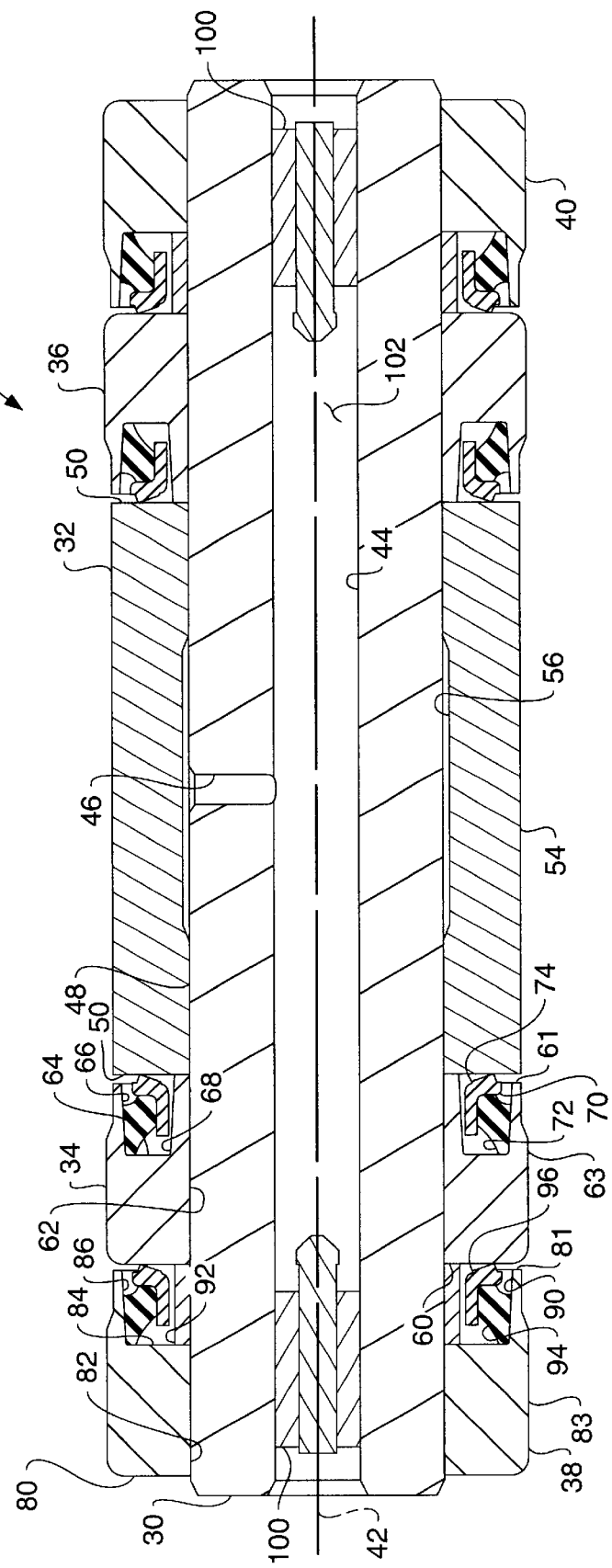
Fig - 3 -

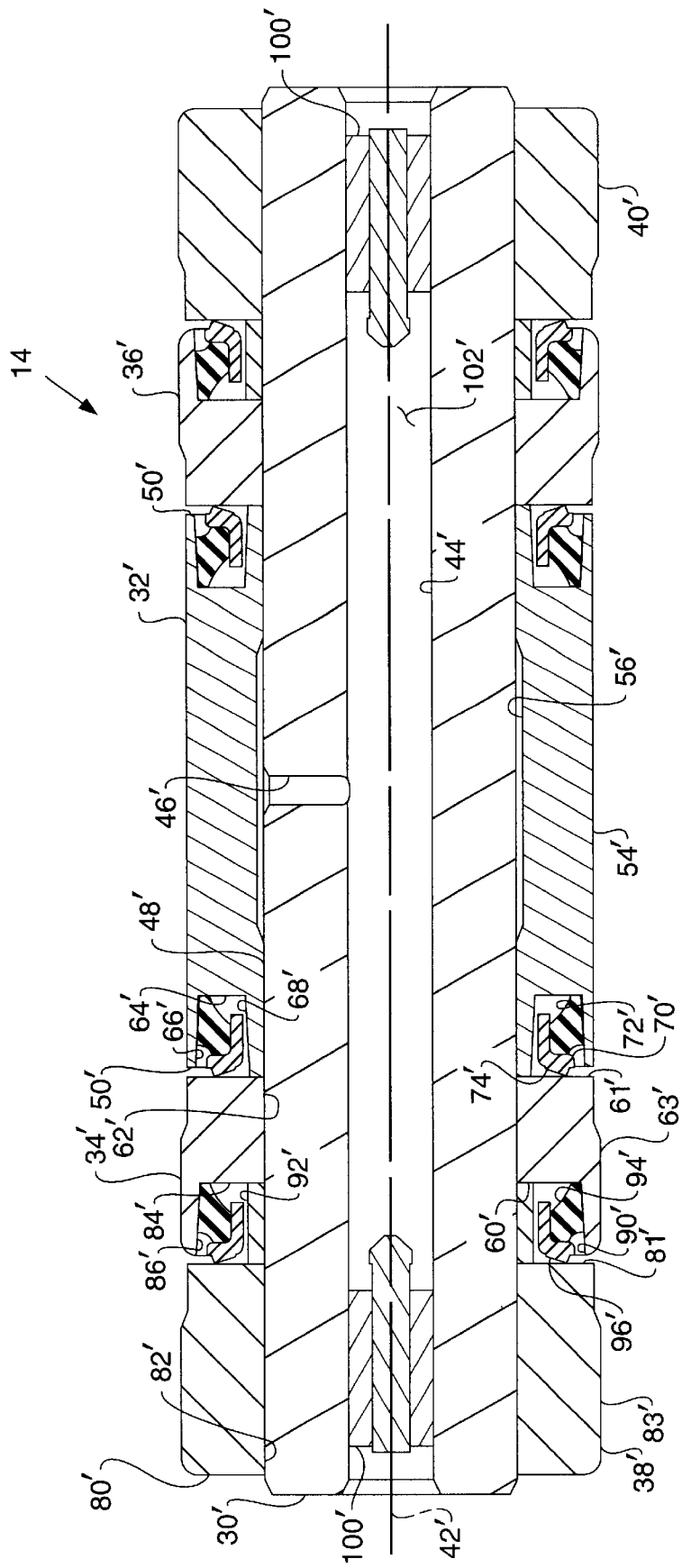
Fig-3a-

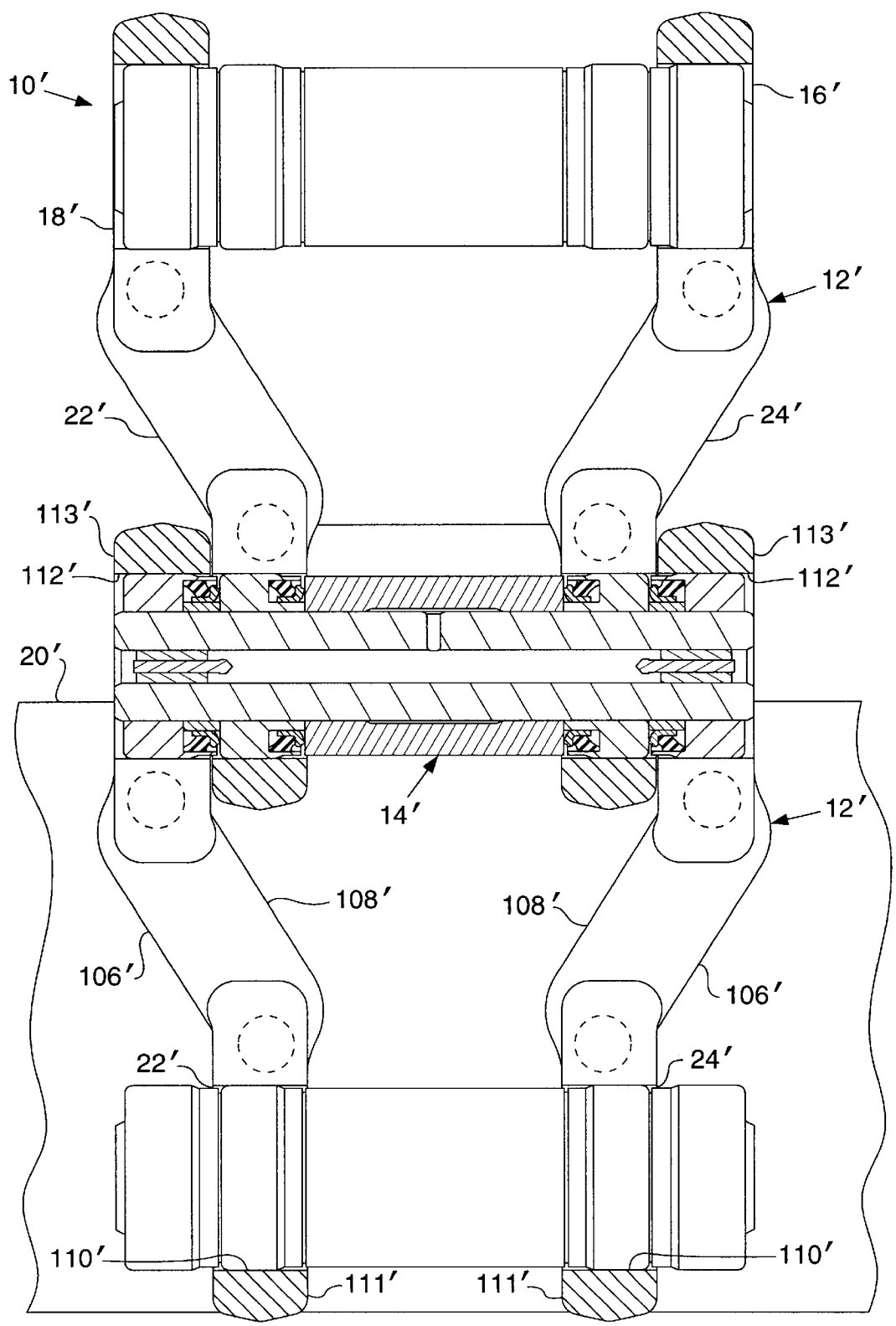
Fig_4_

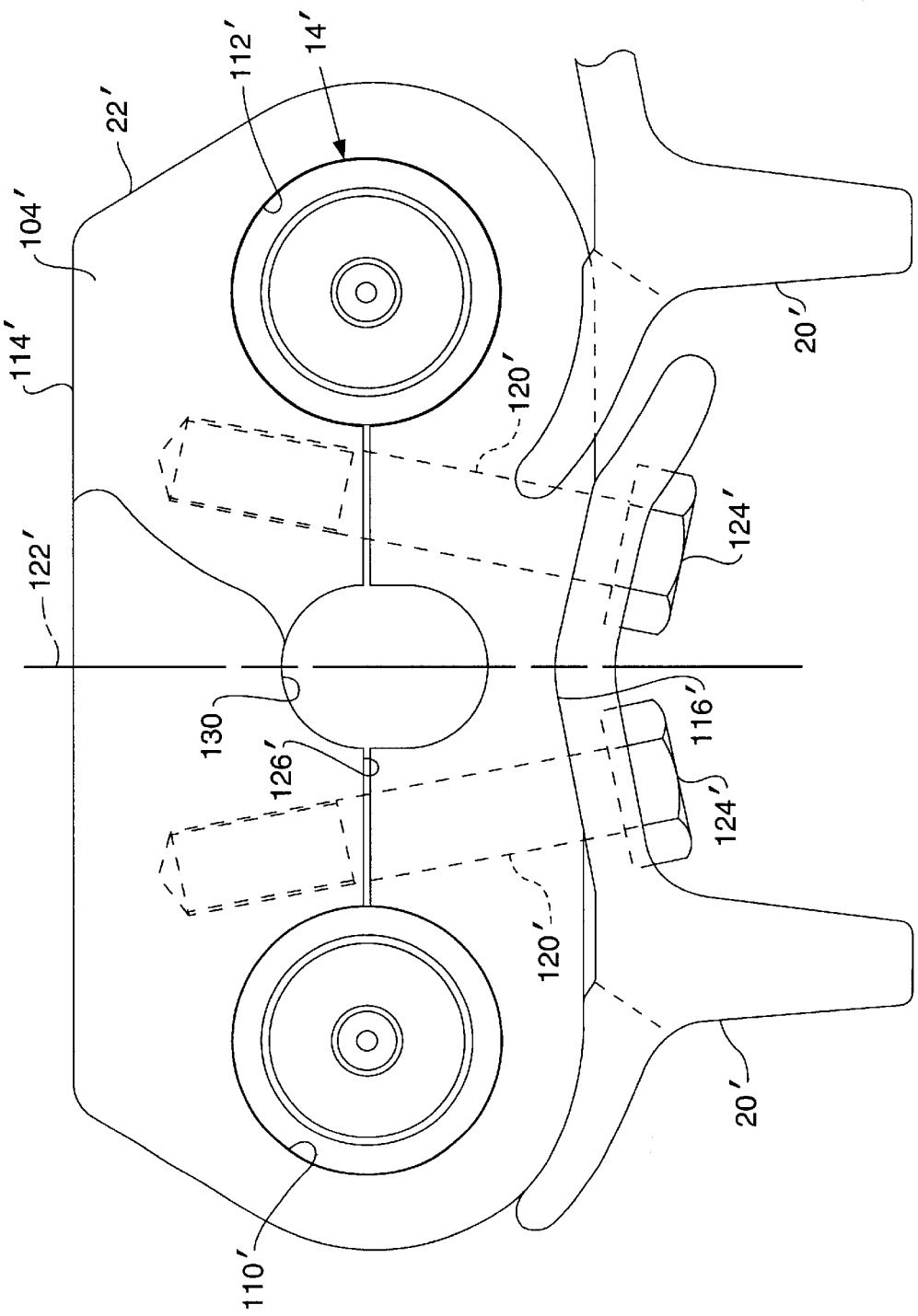

US 6,739,680 B2

CARTRIDGE ASSEMBLY FOR A TRACK CHAIN

TECHNICAL FIELD

The invention relates generally to a track chain for a track laying work machine and, more particularly, to a cartridge assembly for a track chain assembly.

BACKGROUND

Track laying work machines utilize articulating track chains for propelling the work machines over the terrain during operation. Such track chains operate in extremely adverse environments in which track joints may be exposed to various abrasive mixtures of water, dirt, sand, rock or chemical elements and to wide temperature ranges varying from high heat in deserts and extreme cold in artic regions. Consequently, seals are placed in the track joints and must be maintained to ensure that the seal will effectively exclude contaminants and retain lubricant during use.

Typical track chain designs typically include a track pin either rotatably or fixed to a pair of chain links and have a bushing rotatably positioned between the links and about the track pin. These designs have included a variety of seal configurations and positions such as against an inside face of the link or against the track bushing. One prior art design that uses a sealed and lubricated cartridge assembly for the track pin and bushing arrangement namely U.S. Pat. No. 6,382,742 for a "Cartridge Assembly for a Track Chain of a Track Type Work Machine", issued May 7, 2002 to Hasselbusch et al., and assigned to the assignee of the present application, has greatly improved the retention of lubrication and the exclusion of contaminants. This cartridge assembly includes a bushing having a stepped passage rotatably positioned about a track pin. A pair of rotatable bearing members are positioned adjacent each end face of the bushing. The bearing members and the bushing are retained by a pair of collars that are press fit and laser welded to the ends of the track pin. A seal groove is positioned in each end of the bearing members in which a seal arrangement is placed. The seal arrangement pushes against the end faces of the track bushing and the end faces of the collars. However, keeping the seal area free from contaminants and the positioning of the seals is critical to the design.

The present invention is directed to overcoming one or more of the problems as set forth above.

SUMMARY OF THE INVENTION

In one aspect of the present invention a cartridge assembly for a track chain is provided. The cartridge assembly includes a track pin, a bushing, bearing members and collars. The track pin defines a longitudinal axis and has a bore positioned therethrough. The bushing has a pair of end faces and a passage is defined therethrough and is rotatably positioned about the track pin. The bearing members have a first end portion, a second end portion and a bore is defined therethrough. The bearing members are positioned about the track pin so that the second end portion of each of the bearing members is adjacent to the bushing. The collars have a first end portion, a second end portion and a bore defined therethrough. The collars are positioned about the track pin so that the second end portion of each of the collars is adjacent the first end portion of each of the bearing members. A first seal arrangement is positioned in at least one the pair of end faces of the bushing and the second end portion of each of the bearing members. A second seal arrangement is positioned in at least one of the first end portion of each of the bearing members and the second end portion of each of the collars.

BRIEF DESCRIPTION OF THE DRAWINGS

FIG. 1 is a top elevational view of a portion of the track chain assembly embodying the present invention;

FIG. 2 is a side elevational view of a master link from FIG. 1;

FIG. 3 is a longitudinal cross sectional view of a cartridge assembly of the track chain shown in FIG. 2;

FIG. 3a is an alternate embodiment of the longitudinal cross sectional view of the cartridge assembly of the track chain shown in FIG. 2;

FIG. 4 is a top elevational view of an alternate embodiment of a portion of the track chain assembly; and FIG. 5 is a side elevational view of an alternate embodiment of master link from the track chain of FIG. 4.

DETAILED DESCRIPTION

Referring now to FIG. 1, a track chain assembly 10, only a portion of which is shown, includes a plurality of subassemblies 12. Each subassembly 12 includes a cartridge assembly 14, an inner and outer link 16, 18 and a track shoe 20 connected to the outer and inner links 16, 18. A number of subassemblies 12 are mechanically coupled to adjacent subassemblies 12 so that when an appropriate number of these subassemblies 12 are connected together, the track chain assembly 10 is formed. The track chain assembly 10 has a predetermined length for a given application with opposite ends that are capable of being connected together to form a closed loop. The closed loop is formed by mechanically coupling the opposite ends together with an inner and outer master link 22, 24.

As shown in FIG. 3, cartridge assembly 14 includes a track pin 30, a bushing 32, first and second bearing members 34, 36, and first and second collars 38, 40. The track pin 30 defines a central longitudinal axis 42 and has a bore 44 concentrically positioned therethrough. A cross bore 46 extends from an outer surface 48 of the track pin 30 inward towards the bore 44 normal to the central longitudinal axis 42. Bushing 32 has a pair of end faces 50, an outer surface 54 and a stepped passage 56 concentrically positioned in respect to the outer surface 54. It should be appreciated that the first bearing member 34 and first collar 38 are substantially identical to the second bearing member 36 and second collar 40, therefore only first bearing member 34 and first collar 38 will be described in detail herein.

First bearing member 34 includes a first end portion 60, a second end portion 61, a bore 62 and an outer surface 63. The first end portion 60 extends radially outward away from the bore 62 and forms an abutting surface. A seal groove 64 is positioned in the second end portion 61 such that seal groove 64 is concentric with central longitudinal axis 42. The seal groove 64 has an outer wall segment 66 and an inner wall segment 68. Outer wall segment 66 is tapered outwardly with respect to the central longitudinal axis 42 at a predetermined angle. In a preferred the predetermined angle is about 5°. In a similar manner inner wall segment 68 is tapered inwardly with respect to central longitudinal axis 42. It should also be recognized that the inner wall segment 68 extends axially beyond the outer wall segment 66, the benefits of which will be described in more detail below.

Still referring to FIG. 3, a first seal arrangement 70 is shown positioned in the seal grove 64. First seal arrangement 70 includes an annular load ring 72 and a seal member 74. Annular load ring 72 is made from, for example, a polycarbonite compound and seal member 74 is made from, for example, polyurethane compound. Both the annular load ring 72 and the seal member 74 could however be made from other materials without altering the functional aspects of the design. Load ring 72 and seal member 74 are positioned in seal groove 64 so that load ring 72 urges seal member 74 in an axial direction outward from the seal groove 64. Having outer wall segment 66 angled away from the central longitudinal axis 42 in the above described manner facilitates the insertion of load ring 72 and seal member 74 into seal groove 64. In particular, the predetermined angle of outer wall segment 66 enhances the installation capability of machinery utilized to insert first seal arrangement 70 into seal groove 64.

First collar 38 includes a first end portion 80, a second end portion 81, a bore 82, and an outer surface 83. The first end portion 80 extends outward from the bore 82 and forms an outer radial surface. A seal groove 84 is positioned in the second end portion 81 such that seal groove 84 is concentric with central axis 42. The seal groove 84 has an outer wall segment 86. Wall segment 86 is tapered outwardly with respect to central longitudinal axis 42 at a predetermined angle similar to the outer wall segment 66 of the first bearing member 34. Again, in a preferred embodiment the predetermined angle is about 5°.

Still referring to FIG. 3, a second seal arrangement 90 and an annular axial preload member 92 are shown positioned in the seal groove 84. Second seal arrangement 90 includes an annular load ring 94 and a seal member 96. Annular load ring 94 and seal member 96 are similar in composition and function to that of annular load member 72 and seal member 74 as described above. Load ring 94 and seal member 96 are positioned in seal groove 84 so that load ring 94 urges seal member 96 in an axial direction outward from the seal groove 84.

Although the example disclosed herein has a seal groove 64 positioned in the bearing members 34, 36 and a seal groove 84 positioned in the collars 38, 40, it is also contemplated that alternative positions for the seal grooves 64, 84 could be used. For example, a seal groove may be positioned in each end face 50 of the track bushing 32, with each of the bearing members 34, 36 flipped end for end and the collars 38, 40 would be void of a seal groove 84. As shown in FIG. 3a, this alternate embodiment of the cartridge assembly 14 is shown with all elements being shown with a prime designation. Additionally, the bearing members 34, 36 may not have seal grooves and instead seal grooves only placed in the collars 38, 40 and each end face 60 of the track bushing 32 for comparable capability, function and results.

A pair of plugs 100 are positioned in the bore 44 of the track pin 30 forming a fluid reservoir 102 in the bore 44 thereof. The pair of plugs 100 sealably prevents a fluid, such as lubricating oil, from leaking from the bore 44. In use, fluid disposed within fluid reservoir 102 of the cartridge assembly 14, is in fluid communication with and advanced through cross bore 46 to the outer surface 48 of track pin 30. Once disposed on outer surface 48, the fluid facilitates the rotation of first and second bearing members 34, 36, and bushing 32 relative to track pin 30. Retention of the fluid within the cartridge assembly is assisted by first and second seal arrangements 70, 90, the first ends 60 of bearing members 34, 36, and the end faces 50 of the bushing 32 while keeping debris out (e.g. sand, dirt, etc).

Referring now to FIGS. 1 and 2, the inner and outer link 16,18 and the inner and outer master links 22, 24 in this embodiment are shown as being straight links each having a first end portion 111 and a second end portion 113. The inner master link 22 is an exact duplicate the outer master link 24 therefore only inner master link 22 will be described in detail and the same elements will be represented by like numbers. It should be recognized that the terms inner and outer, in reference to links 16, 18 and master links 22, 24, in this example are used merely as descriptors for the orientation shown in the figures. Other terms such left, right and first, second could be interchangeably used as well.

Inner link 22 includes a body portion 104 with a first side 106 and a second side 108 spaced opposite the first side 106. A first aperture 110 extends through the first end portion 111. A second aperture 112 extends through the second end portion 113. Body portion 104 also includes a rail surface 114 and a shoe surface 116. An aperture 120 is positioned on both sides of and a predetermined distance from a central vertical axis 122. It should be appreciated that each aperture 120 is laterally centered with respect to the widest portion of body portion 104. A fastener 124 is positioned in each of the aperture 120 and utilized to secure track shoe 20 to shoe surface 116 of inner master link 22. Additionally, a gap 126 is formed between the first aperture 110 and the second aperture 112 extending through the body portion 104 from the first side 106 to the second side 108. As the fasteners 124 are tightened to secure the track shoe 20 to the inner master link 22 the width of the gap 126 is reduced or pulled together, effectively reducing the diameter of the first and second aperture 110, 112. Thus, the first aperture 110 and the second aperture 112 are secured to the collars 38,40 of adjacent cartridge assemblies 14.

Referring now to FIGS. 4 and 5, an alternate embodiment of the track chain assembly 10, only a portion of which is shown, with like elements of the first embodiment being represented by a prime designation. The track chain assembly 10' includes a plurality of subassemblies 12'. Each subassembly 12' includes a cartridge assembly 14', an inner and outer link 16', 18' and a track shoe 20' connected to the inner and outer links 16', 18'. An inner and outer master link 22', 24' is used to connect opposite ends of the track chain assembly 10' to form a closed loop.

The inner and outer links 16', 18' and the inner and outer master links 22', 24', in this embodiment, are offset links each being a mirror image of the other, the inner master link 22' therefore will be described in detail. Inner link 22' includes a body portion 104' having a first side 106', a second side 108', a first aperture 110', a second aperture 112', a rail surface 114', and a shoe surface 116'. Body member 104' also has an exit hole 130 interposed between first aperture 110' and second aperture 112'. An aperture 120' is positioned on either side of a vertical axis 122'. Apertures 120' are positioned at a predetermined angle with respect to the central vertical axis 122'. A fastener 124' is positioned in each of the apertures 120' and utilized to secure track shoe 20' to shoe surface 116' of inner master link 22'. Additionally, a gap 126' is positioned between the first aperture 110' and the second aperture 112' and extends through the exit hole 130 from the first side 106' to the second side 108'. As the fasteners 124' are tightened to secure the track shoe 20' to the inner and outer master links 22', 24' the diameter of the first and second aperture 110', 112' is effectively reduced. Thus, the first aperture 110' are secured to bearing members 34', 36' of one cartridge assembly 14' and the second aperture 112' are secured to the collars 38', 40' of an adjacent cartridge assembly 14'. In this embodiment, however, .the inner and outer links 16', 18' and the inner and outer master links 22', 24' are offset links.

Therefore, this application would require a pair of inner master links 22' and a pair of outer master links 24'. In this manner, the first aperture 110' of an inner and outer master link 22', 24' is secured to the bearing members 34', 36' of one cartridge assembly 14' and the second aperture 112' of an adjacent inner and outer master link 22', 24' is secured to the collars 38', 40' of the same cartridge assembly 14'.

INDUSTRIAL APPLICABILITY

The track chain assembly 10, 10' is assembled and operates as follows. The cartridge assembly 14, 14' can be preassembled prior to assembling the track chain 10, 10' in the following manner. The track pin 30 is inserted into the stepped passage 56 of bushing 32 such that bushing 32 can rotate relative to track pin 30. First seal arrangements 70 are inserted into the seal groove 64 of the bearing members 34, 36. The bearing members 34, 36 are positioned relative to track pin 28 until the inner wall segment 68 is positioned in close proximity to the end face 50 of bushing 32 with the seal groove 64 positioned adjacent to each end face 50 of bushing 32. This positions the seal member 74 to be urged against end face 50 of bushing 32. The bushing 32 and the bearing members 34, 36 are positioned along axial center of the track pin 30 so that a portion of the track pin 30 extends through bore 62 and beyond the first end portion 60. It should be appreciated that bearing members 34, 36 can rotate about the track pin 30 around axis 42 relative to both bushing 32 and track pin 30.

Annular axial preload members 92 are positioned about the outer surface 48 of the track pin 30 adjacent to the first end portion 60 of the bearing members 34, 36. First seal arrangements 70 are inserted into the seal groove 84 of the collars 38, 40. The collars 38, 40 are positioned relative to track pin 30 and bearing member 34, 36 so that a portion of track pin 30 extends into bore 82 with the second end portion 81 of collars 38, 40 in an adjacent relationship to the first end portion 60 of bearing members 34, 36. This positions the seal member 94 to be urged against the first end portion 60 of each bearing member 34, 36. The annular axial preload member 92 controls the distance that the collars 38, 40 can be positioned inward toward bearing members 34, 36, and thus the bearing members 34, 36 moved inward toward the bushing 32.

The collars 38, 40 are fixed relative to track pin 30 so that collars 38, 40 will not rotate or move axially relative to track pin 30. For example, collars 38, 40 can be press fit onto, laser welded to, adhesive or chemically bonded to the track pin 30 or any other known manner of attaching two mechanical components. Attaching collars 38, 40 to track pin 30 helps control end play of track chain assembly 10, 10'.

As previously mentioned, referring to FIG. 1, each subassembly 12 includes a cartridge assembly 14, an inner link 16, an outer link 18 and a track shoe 20 fastened to the shoe surface 116 of the inner and outer links 16, 18. Specifically, one sub assembly is completed by positioning inner link 16 relative to cartridge assembly 14 such that bearing member 34 of cartridge assembly 14 is located within aperture 112 of inner link 16, bearing member 36 of cartridge assembly 14 is located within aperture 112 of outer link 18. The combination of the inner link 16, outer link 18 and the cartridge assembly 14 forms a subassembly 12. The next adjacent subassembly 12 would be an outer subassembly 12, comprised of identical components that have the inner link 16 positioned relative to cartridge assembly 14 so that collar 38 is located within aperture 110 of inner link 16 and collar 40 is located within aperture 110 of outer link 18. It should be appreciated that bearing members 34, 36 and collars 38, 40 are press fit into apertures 110 and 112 of the inner and outer links 16, 18. Additionally, the inner links 16 and outer links 18 of adjacent sub assemblies 12 are positioned with a predetermined space therebetween, preferably the predetermined space is 1.5 mm. The outer sub assembly 12 is fixed relative to collars 38, 40 and the track pin 30, with an inner subassembly 12 fixed relative to bearing members 34, 36. This allows the inner subassembly 12 to move relative to the track pin 30 and bushing 32, while the outer subassembly 12 is fixed relative to the track pin 30 but free to pivot relative to the bearing members 34, 36 and the track bushing 32.

This alternating connection of inner and outer assemblies is continued until an appropriate number of adjacent subassemblies 12 are connected together to form a track chain assembly 10 of a given length. Then an inner and outer master link 22, 24 are slid over the collars 38, 40 of two adjacent subassemblies and the last track shoe 20 is fastened in place. By tightening fasteners 124 the width of the gap 126 is reduced or pulled together effectively reducing the diameter of the first and second aperture 110, 112, securing the first and second apertures 110, 112 to the collars 38, 40 of the two adjacent sub assemblies 12.

In the alternate embodiment shown in FIGS. 3 and 4, each subassembly 12' includes a cartridge assembly 14', an inner link 16', an outer link 18' and a track shoe 20' fastened to the shoe surface 116' of the inner and outer links 16', 18'. Specifically, one sub assembly is completed by positioning inner link 16' relative to cartridge assembly 14' such that bearing member 34' of cartridge assembly 14' is located within aperture 110' of inner link 16', bearing member 36' of cartridge assembly 14' is located within aperture 110' of outer link 18' forming a sub assembly 12'. Two adjacent subassemblies 12' are secured together by placing collar 38' within aperture 112' of the inner link 16' and collar 40' within aperture 112' of outer link 18'. It should be appreciated that bearing members 34', 36' are press fit into apertures 110' and collars 38', 40' are press fit into apertures 112' of the inner and outer links 16', 18'. The first end portion 111' of each inner and outer link 16', 18' is fixed relative to bearing members 34', 36' and the second end portion 113' of the inner and outer links 16', 18' fixed relative collars 38', 40' and the track pin 30' of an adjacent an sub assembly 12'. This allows the first end portion 111 ' of inner and outer links 16', 18' to move relative to the track pin 30' and bushing 32', while the second end portion 113' to be fixed relative to the track pin 30' but free to pivot relative to the bearing members 34', 36' and the track bushing 32' of an adjacent sub assembly 12'.

This connection subassemblies 12' is continued until an appropriate number of adjacent subassemblies 12' are connected together to form a track chain assembly 10' of a given length. To connect the ends of the track chain assembly 10' of this embodiment together, two inner and outer master links 22', 24' are required. Apertures 110' of the first end portion 111 ' of an inner and an outer master link 22', 24' are positioned around the bearing member 34', 36' of a cartridge assembly 14'. Apertures 112' of the second end portion 113' of an adjacent set of inner and outer master links 22', 24' are positioned around collars 38', 40' of the same cartridge assembly 14'. The last two track shoes 20' are then fastened to the shoe surface 116' of the two adjacent sets of inner and outer master links 22', 24'. By tightening fasteners 124' the width of the gap 126 is reduced or pulled together effectively reducing the diameter of the first and second apertures 110', 112', securing the first apertures 110' to the bearing members 34', 36' and the second apertures 112' to the collars 38', 40' of the same cartridge assembly 14'. Disconnecting the ends of the track chain assembly 10' of this embodiment requires loosening the fasteners 124' of the adjacent sets of inner and outer master links 22', 24', this allows a single cartridge assembly 14' to be removed and the ends of the track chain assembly 10' to be separated.

What is claimed is:

1. A cartridge assembly for a track chain, comprising:
   a track pin defining a longitudinal axis and having a bore positioned therethrough;
   a bushing having a pair of end faces and a passage defined therethrough and being rotatably positioned about said track pin;
   bearing members having a first end portion, a second end portion and a bore defined therethrough, said bearing members positioned about said track pin so that the second end portion of each of said bearing members being adjacent said bushing;
   collars having a first end portion, a second end portion and a bore defined therethrough, said collars being positioned about said track pin so that the second end portion of each of said collars being adjacent the first end portion of each of said bearing members;
   a first seal arrangement positioned in at least one said pair of end faces of said bushing and said second end portion of each of said bearing members; and
   a second seal arrangement positioned in at least one of said first end portion of each of said bearing members and said second end portion of each of said collars.

2. The cartridge assembly of claim 1, wherein said collars are fixed in relation to said track pin such that said collars are unable to rotate relative to said track pin and said bearing members are able to rotate relative to said collars and said track pin around said longitudinal axis.

3. The cartridge assembly of claim 1, wherein said bearing members are able to rotate relative to said bushing around said longitudinal axis.

4. The cartridge assembly of claim 1, wherein preload on a load ring of said first seal arrangement is controlled by a first wall segment of a seal groove positioned in a one said pair of end faces of said bushing and said second end portion of each of said bearing members.

5. The cartridge assembly of claim 1, wherein preload on a load member of said second seal arrangement is controlled by an annular axial thrust member positioned between a one of said first end portion of each of said bearing members and said second end portion of each of said collars.

6. The cartridge assembly of claim 1, wherein said track pin has a fluid reservoir defined therein.

7. The cartridge assembly of claim 6, wherein said fluid reservoir being in fluid communication with an outer surface of said track pin and the passage of said bushing.

8. The cartridge assembly of claim 1, wherein said bearing members each have an annular seal groove positioned in the second end portion thereof such that said annular seal groove surrounds said track pin.

9. A cartridge assembly for a track chain, comprising:
   a first bearing member having a first end portion, a second end portion, a bore defined therethrough and a seal groove defined in said second end portion;
   a track pin disposed within said first bore of said bearing member;
   a bushing having a passage defined therethrough, said bushing being positioned relative to said track pin and said first bearing member such that said track pin is disposed within said passage and an end face of said bushing is positioned in an opposing relationship with said seal groove of said first bearing member; and
   a first collar having a first end portion, a second end portion, and a bore defined therein, said first collar having a seal groove positioned in the second end portion of said first collar and being positioned relative to said track pin and said first bearing member such that said track pin is disposed within said bore and said second end portion of said first collar is positioned in an opposing relationship with said first end portion of said first bearing member.

10. The cartridge assembly of claim 9, including a first seal arrangement disposed in said seal groove of said first bearing member so that said seal arrangement contacts said end face of said bushing.

11. The cartridge assembly of claim 10, including a second seal arrangement disposed in said seal groove positioned in said second end portion of said first collar so that said second seal arrangement contacts said first end portion of said first bearing member.

12. The cartridge assembly of claim 11, including an annular axial preload member disposed between said second end portion of said first collar and said first end portion of said first bearing member.

13. The cartridge assembly of claim 13, wherein said first seal arrangement and said second seal arrangement include an annular load member and a seal member and said annular axial preload member controls the preload place on the annular load member of the first and second seal arrangement.

14. The cartridge assembly of claim 9, wherein said collar is fixed in relation to said track pin such that said first collar is unable to rotate relative to said track pin, and said first bearing member is able to rotate relative to said first collar and said track pin.

15. The cartridge assembly of claim 14, wherein said first bearing member is able to rotate relative to said bushing.

16. The cartridge assembly of claim 9, wherein said track pin has a fluid reservoir defined therein.

17. The cartridge assembly of claim 9, further comprising:
   a second bearing member having a first end portion, a second end portion, a bore defined therethrough, and a seal groove defined in the second end portion, said second bearing member being positioned relative to said track pin and an end face of said bushing such that said track pin is disposed in said bore and said end face of said bushing is positioned in an opposing relationship with said seal groove of said second bearing member; and
   a second collar having a first end portion, a second end portion, and a bore defined therein, said second collar being positioned relative to said track pin and said second bearing member such that said track pin is disposed within said bore and said second end portion of said second collar is positioned in an opposing relationship with said first end portion of said second bearing member.

18. The cartridge assembly of claim 17, wherein:
   said second collar is fixed in relation to said track pin such that second collar is unable to rotate relative to said track pin, and
   said second bearing member is able to rotate relative to said second collar and said track pin.

19. The cartridge assembly of claim 18, wherein:
   said second bearing member is able to rotate relative to said bushing.

20. A track chain assembly comprising:
   a plurality of subassemblies each being operatively connected to an adjacent subassembly;

wherein each subassembly includes an inner link, an outer link and a cartridge assembly, said cartridge assembly including;
- a track pin having a bore positioned therethrough and defining a longitudinal central axis;
- a bushing having a stepped passage defined therethrough, and a pair of end faces, said bushing being rotatably positioned about said track pin;
- a first bearing member having a first end portion, a second end portion having a seal groove defined therein, a bore defined therethrough, said second end portion positioned adjacent an end face of said bushing; and a seal groove defined in said second end portion;
- a second bearing member having a first end portion, a second end portion having a seal groove defined therein, a bore defined therethrough, said second end portion positioned adjacent an end face of said bushing; and a seal groove defined in said second end portion;
- a first collar having a first end portion, a second end portion, and a bore defined therein, said first collar being positioned relative to said track pin and said first bearing member such that said track pin is fixedly disposed within said bore and said second end portion of said first collar is positioned in an opposing relationship with said first end portion of said first bearing member; and
- a second collar having a first end portion, a second end portion, and a bore defined therein, said second collar being positioned relative to said track pin and said second bearing member such that said track pin is fixedly disposed within said bore and said second end portion of said second collar is positioned in an opposing relationship with said first end portion of said second bearing member.

* * * * *

UNITED STATES PATENT AND TRADEMARK OFFICE
CERTIFICATE OF CORRECTION

PATENT NO.    : 6,739,680 B2
DATED         : May 25, 2004
INVENTOR(S)   : Michael D. Hasselbusch et al.

It is certified that error appears in the above-identified patent and that said Letters Patent is hereby corrected as shown below:

Column 7,
Line 18, after "portion" (second occurrence) insert -- , an outer surface --
Line 22, after "members" insert -- , said outer surface of said collars being adapted for being received by an aperture of a track link; --

Column 8,
Line 2, after "portion" insert -- , an outer surface, --
Line 9, after "member" insert -- , said outer surface of said first collar being adapted for being received by an aperture of a track link. --

Column 10,
Lines 2 and 11, after "portion" insert -- , an outer surface --
Line 9, after "member" insert -- , said outer surface of said first collar being adapted for being received by an aperture of a one of said inner and outer link; --
Line 16, after "member" insert -- , said outer surface of said second collar being adapted for being received by an aperture of a one of said inner and outer link. --

Signed and Sealed this

Fourteenth Day of December, 2004

JON W. DUDAS
*Director of the United States Patent and Trademark Office*